United States Patent [19]
> Yoshinaka

[11] Patent Number: 4,733,311
[45] Date of Patent: Mar. 22, 1988

[54] AUTOMATIC PHASE CONTROL CIRCUIT USED FOR TIME BASE CORRECTOR

[75] Inventor: Tadaaki Yoshinaka, Kanagawa, Japan

[73] Assignee: Sony Corporation, Tokyo, Japan

[21] Appl. No.: 789,827

[22] Filed: Oct. 21, 1985

[30] Foreign Application Priority Data

Oct. 20, 1984 [JP] Japan .................. 59-220738

[51] Int. Cl.[4] .................. H04N 5/76; H04N 5/04
[52] U.S. Cl. .................. 358/320; 358/326; 358/337; 360/36.1; 360/36.2
[58] Field of Search .................. 358/17, 19, 148, 320, 358/321, 326, 337, 338; 360/36.1, 36.2

[56] References Cited

U.S. PATENT DOCUMENTS 4,015,288 3/1977 Ebihara et al. .................. 358/19
4,054,903 10/1977 Ninomiya .................. 358/19
4,373,168 2/1983 Mizukami et al. .................. 358/19

FOREIGN PATENT DOCUMENTS

1465314 2/1977 United Kingdom .
1515584 6/1978 United Kingdom .

Primary Examiner—Robert L. Richardson
Attorney, Agent, or Firm—Lewis H. Eslinger

[57] ABSTRACT

There is disclosed an automatic phase control apparatus for controlling a phase of a phase information signal used for producing an initial address, the initial address being used for writing into or for reading out from a memory circuit of a time base corrector for reducing a time base error included in a reproduced video signal, including a phase shift circuit for shifting the phase of a horizontal synchronizing pulse, a phase comparator for comparing a phase between the phase shifted horizontal synchronizing pulse and a constant wave signal being in phase with a chroma burst signal and a feedback circuit between the phase comparator and the phase shift circuit for applying a feedback signal in relation to an output signal of the phase comparator to the phase shift circuit so that the phase of the phase information pulse signal is synchronized with the constant wave signal. In this case, the automatic phase control apparatus is characterized by the feedback circuit which includes a capacitor for holding the amplitude of the output signal of the phase comparator, a display circuit connected to the capacitor for indicating the value of the output signal of the phase comparator and a stabilizer circuit connected between the capacitor and a switch circuit for stabilizing the feedback signal so that the value of the feedback signal is approximately zero voltage when the switch circuit is operated.

2 Claims, 40 Drawing Figures

AUTOMATIC PHASE CONTROL CIRCUIT USED FOR TIME BASE CORRECTOR

BACKGROUND OF THE INVENTION

1. Field of the Invention

This invention relates generally to an automatic phase control apparatus for use with a time base corrector and more particularly is directed to an automatic phase control apparatus for use with a time base corrector which is suitable for being applied to a video signal processing apparatus used in a video tape recorder (VTR).

2. Description of the Prior Art

In the VTR, for a color framing detecting apparatus, a time base correcting apparatus and the like, it is necessary to establish a predetermined phase relation between a phase of a horizontal synchronizing signal and a phase of a subcarrier produced from a burst signal of a composite video signal. To this end, an automatic phase control (APC) circuit is used. For example, in time base correcting apparatus (TBC), a prior art circuit arrangement as shown in FIG. 1 is used.

Figure 1:
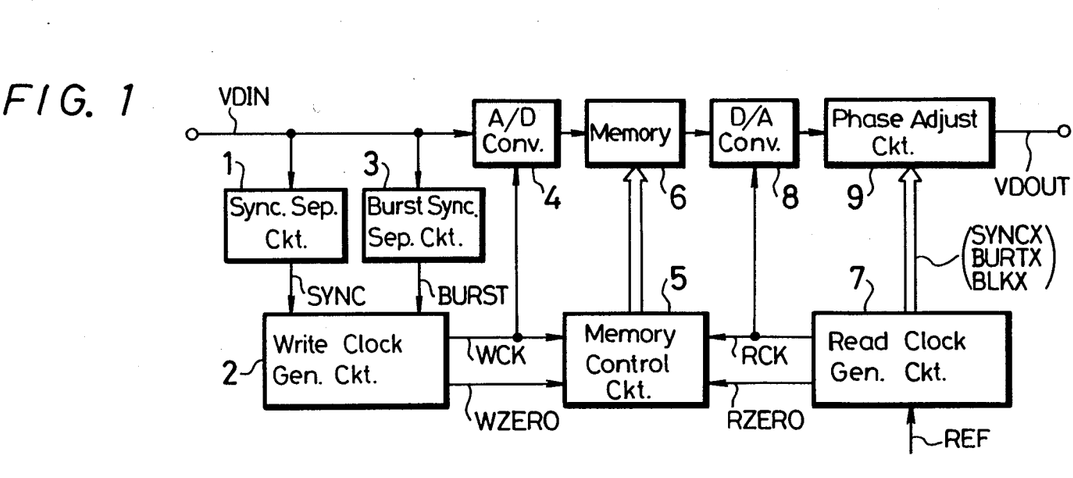
FIG. 1 is a block diagram showing an example of a prior art time base correcting apparatus.

In the circuit shown in FIG. 1, a synchronizing signal SYNC is extracted from a reproduced input signal VDIN reproduced from a tape in a synchronizing separating circuit 1, and then supplied to a write clock generating circuit 2. Also, a reproduced burst signal BURST is extracted from the reproduced input signal VDIN in a burst synchronizing separating circuit 3, and then supplied to the write clock signal generating circuit 2.

The write clock signal generating circuit 2 produces a write clock signal WCK and a write start pulse signal WZERO which are synchronized with the synchronizing signal SYNC and the reproduced burst signal BURST and hence contain time basis fluctuations. The write clock signal WCK is supplied to an A/D (analog-to-digital) converting circuit 4 as its sampling signal and also to a memory control circuit 5 together with the write start pulse signal WZERO.

When supplied with the write start pulse signal WZERO, the memory control circuit 5 designates a start address of each scanning line to a memory 6 and then sequentially writes video signal data of one scanning line amount by sequentially incrementing the address of the memory 6 by the write clock signal WCK.

The data written in the memory 6 is read out by a read clock signal RCK and a read start pulse signal RZERO produced from a read clock generating circuit 7 which receives a reference pulse signal REF having a stable period on the basis of the reference pulse signal REF. In other words, when receiving the read start pulse signal RZERO, the memory control circuit 5 designates the start address of the memory area in which the data of each scanning line is stored. Thereafter, the memory control circuit 5 sequentially reads out the video data of 1H (H is the horizontal period) from the memory 6 by sequentially incrementing the address by the read clock signal RCK.

This video signal data is converted to an analog signal by a D/A (digital-to-analog) converting circuit 8 which is driven by the read clock signal RCK and then fed to a phase adjusting circuit 9. The phase adjusting circuit 9 adds the video signal data with a synchronizing signal SYNCX, a burst signal BURSTX and a blanking pulse BLKX that are respectively produced from the read clock generating circuit 7 on the basis of the reference pulse signal REF and delivers the same as a reproduced output signal VDOUT.

In the TBC arranged as shown in FIG. 1, when the video signal data of each scanning line is written in the memory 6, it is necessary that, in order to repeatedly write the start data of the video signal in the memory area having a predetermined start address with good reproducibility, the timing (that is, the phase) at which the memory control circuit 5 produces the start address be automatically adjusted.

Particularly, in order to maintain the continuity of the phase of the color subcarrier in the memory 6 and to easily make the correspondence in the processing at the read side circuit, when the video signal data is written in the memory 6, data corresponding to one period of the color subcarrier must be written as a unit.

For this reason, in the memory control circuit 5, the timing at which it produces the write start pulse signal WZERO must be synchronized with the color subcarrier. However, when a television signal in the NTSC system is processed, the frequency of the color subcarrier is (455/2) times the line frequency so that the phase of the subcarrier at each adjacent scanning line is displaced by ½ period. Accordingly, it is necessary to displace the phases of the write start pulse signal WZERO supplied from the write clock generating circuit 2 and the read start pulse signal RZERO transmitted from the read clock generating circuit 7 by ½ period (about 140 ns) of the color subcarrier at every line.

As in the writing mode the phase of the write start pulse signal WZERO is displaced by ½ period at every horizontal line, the phase of the read start pulse signal RZERO is correspondingly displaced by ½ period at every horizontal line similarly in the reading mode, so that the phase relation between the video signal data read out from the memory 6 is recovered completely.

Figure 2:
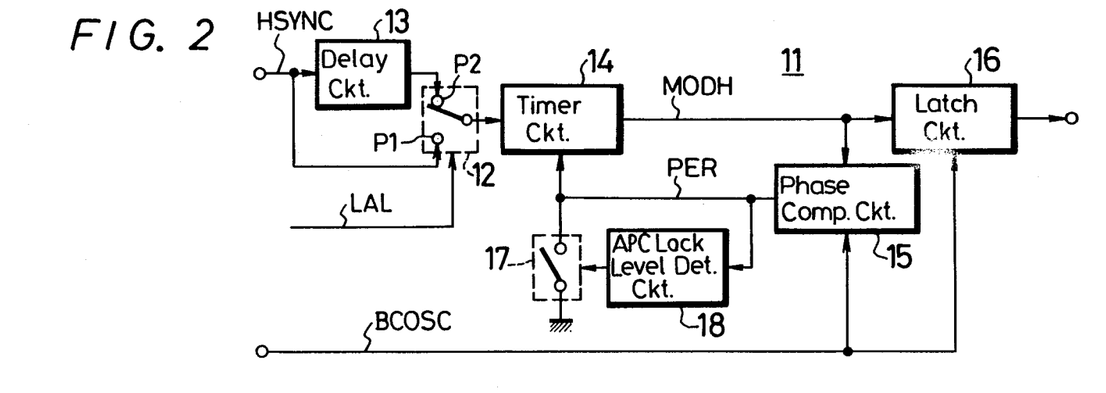
FIG. 2 is a block diagram showing an example of a prior art automatic phase control apparatus for producing a write start pulse signal.

In order to produce the write start pulse signal WZERO and the read start pulse signal RZERO having such phase displacement, in the prior art such an automatic phase control circuit (APC circuit) 11 as shown in FIG. 2 is provided. In FIG. 2, there is shown the write clock generating circuit 2.

In the APC circuit 11, a horizontal synchronizing signal HSYNC contained in the synchronizing signal SYNC supplied from the synchronizing separating circuit 1 (FIG. 1) is applied to a switching input terminal P1 of a switching circuit 12 directly, while it is delayed by a delay circuit 13 and then fed to another switching input terminal P2 of the switching circuit 12. The switching circuit 12 is changed in position to the switching input terminal P1 or P2 at every 1H interval by a line sequential switching signal LAL which changes its logic level at every 1H period on the basis of the reproduced horizontal synchronizing signal HSYNC. Accordingly, the reproduced horizontal synchronizing signal HSYNC is delayed by ½ period (about 140 ns) at every 1H interval and then fed to a timer circuit 14 formed as a monostable-multivibrator arrangement as its trigger signal.

The timer circuit 14 produces a timer output MODH indicative of a time point close to the time point at which the write start pulse signal WZERO is to be produced on the basis of the timing of the reproduced horizontal synchronizing signal HSYNC. When the timer circuit 14 receives the reproduced horizontal synchronizing signal HSYNC (FIG. 3B-2) at a time point $t_0$ from the switching input terminal P1 of the switching circuit 12 with respect to an N-th scanning line LN as shown in FIGS. 3A-2 to 3E-2, the timer circuit 14 produces the timer output MODH which rises to logic "1" which is shown in FIG. 3D-2. Thereafter, the timer circuit 14 operates to change the timer output MODH to logic "0" at a time point just before the time point $t_2$ at which the write start pulse signal WZERO (FIG. 3E-2) is produced. In the case, it is previously determined that the write start pulse signal WZERO is produced at the zero cross time point $t^2$ (crossing from the negative side to the positive side) of a predetermined order of a reference burst signal BCOSC (FIG. 3C-2) which is produced from the write clock generating circuit 2 (FIG. 1) on the basis of the reproduced burst signal BURST.

Figure 3A:
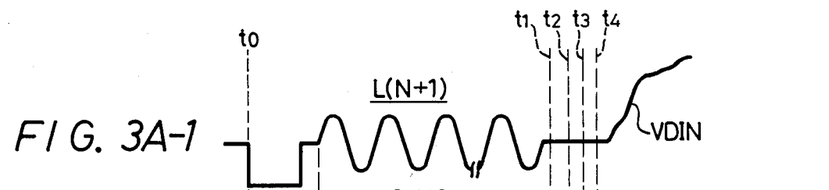
Figures 3A, 3B:
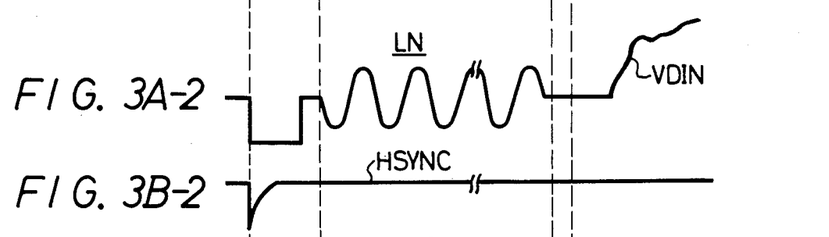
Figures 3B, 3C, 3D:
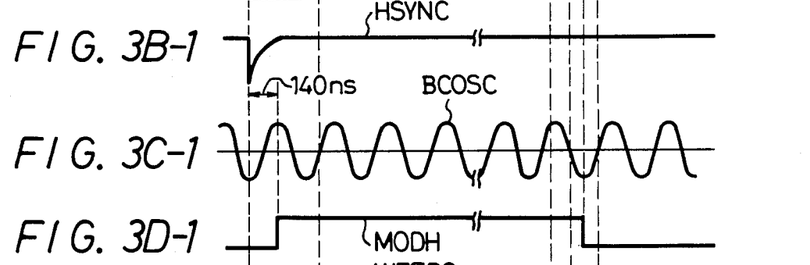
Figure 3C:
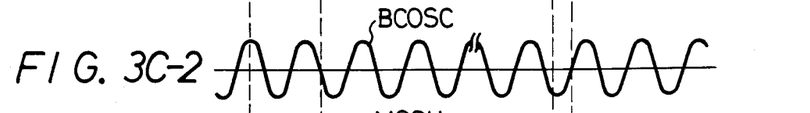
Figures 3D, 3E:
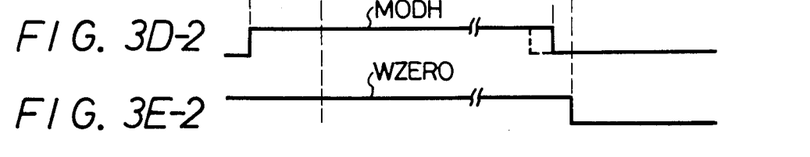
Figure 3E:
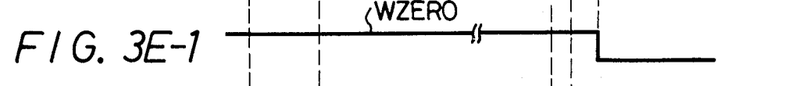

Whereas, with respect to an (N+1)th scanning line L(N+1), the timer circuit 14 receives the reproduced horizontal synchronizing signal HSYNC through the delay circuit 13 and the switching input terminal P2 of the switching circuit 12 as the trigger signal so that as shown in FIG. 3D-1, the timer circuit 14 produces the timer output MODH which rises at a time point delayed from the time point $t_0$ by the delay time (140 ns) of the delay circuit 13. Thereafter, at a time point near a time point $t_4$ at which the write start pulse signal WZERO is to be produced, the timer circuit 14 changes the logic level of the timer output MODH to "0". In this case, since the phase of the reference burst signal BCOSC is delayed by ½ period (corresponding to the delay time of the delay circuit 13) of the color burst signal as compared with the case of FIG. 3C-2, the falling timing of the timer output MODH of the timer circuit 14 occurs just before the write start pulse signal WREZO in any scanning line.

This timer output MODH is supplied to and compared with the reference burst signal BCOSC by a phase comparing circuit 15. The phase comparing circuit 15 compares the falling edges (FIGS. 3D-2 and 3D-1) of the timer output MODH with the zero cross points of the reference burst signals (FIGS. 3C-2 and 3C-1), produces a phase error output PER indicative of the phase difference and then supplies it to the timer circuit 14 as a measuring time control signal. At that time, the timer circuit 14 is operated such that the phase error output PER indicates a phase difference relative to the phase which is previously determined to be a phase just advanced from the zero cross point of the reference burst signal BCOSC.

The timer output MODH the phase of which is controlled as above is supplied as an input data to a latch circuit 16 that performs the latch operation at the zero cross point of the reference burst signal BCOSC. Then, the latch circuit 16 delivers the write start pulse signal WZERO which falls down to "0" at the time point at which reference burst signal BCOSC crosses the zero cross point. Thus, since the timer output MODH is fallen to logic "0" just before the time point (that is, $t_2$ and $t_4$) at which the video signal data of the reproduced input siganl VDIN is started to be written in the memory 6, it is possible to surely produce the write start pulse signal WZERO that is synchronized with the zero cross point of the reference burst signal BCOSC.

In addition to the above-mentioned circuit arrangement, in the APC circuit 11 of FIG. 2, a switching circuit 17 is provided at the output terminal of the phase comparing circuit 15 and a predetermined voltage, for example, an earth voltage is supplied through this switching circuit 17. When the signal level of the phase error output PER exceeds over a lock-in range, the switch 17 is closed by a detecting output of an APC releasing level detecting circuit 18, to thereby return the phase error output PER to the earth voltage.

In this circuit arrangement, since the phase locking loop by the output of the phase comparing circuit 15 is changed over in stable point at every scanning line, there is then a fear that the timer output MODH will not be locked in the phase immediately before the time point $t^2$ or $t_4$ of FIG. 3. Further, there is a fear that when the reproduced horizontal synchronizing signal HSYNC is dropped by, for example, dropout or phase jump, the timer output MODH will not be locked in. Accordingly, when the phase error output PER of the phase comparing circuit 15 is fluctuated to the value that can not lock in, this fluctuation is detected by the APC locking level detecting circuit 18 and the phase error output PER is forced to be locked to zero volts through the switching circuit 17 so that the APC operation is returned to the normal operation state. Thus, when the reproduced horizontal synchronizing signal HSYNC is returned to the normal operation state, the timer output MODH of the timer circuit 14 is returned to the nearest stable point (the zero cross point of the reference burst signal BCOSC) so that the phase reproducibility of the write start pulse signal WZERO may be secured.

However, in the circuit arrangement of FIG. 2, if the timer output MODH falls down at the time point at which the trailing edge of the timer output MODH corresponds to the center of the stable point which exists at every period of the reference burst signal BCOSC, there exist two stable points. In practice, when the timer circuits are produced, the counting times thereof inevitably are scattered and hence there is a fear that an inaccurate timer circuit will be used.

In this case, the write start pulse signal WZERO of the single phase can not be produced, so that the APC circuit with such a timer circuit can not be used in editing the reproduced video signal, in which the reproducibiliy of the phase of the video signal is strictly demanded.

Figure 4:
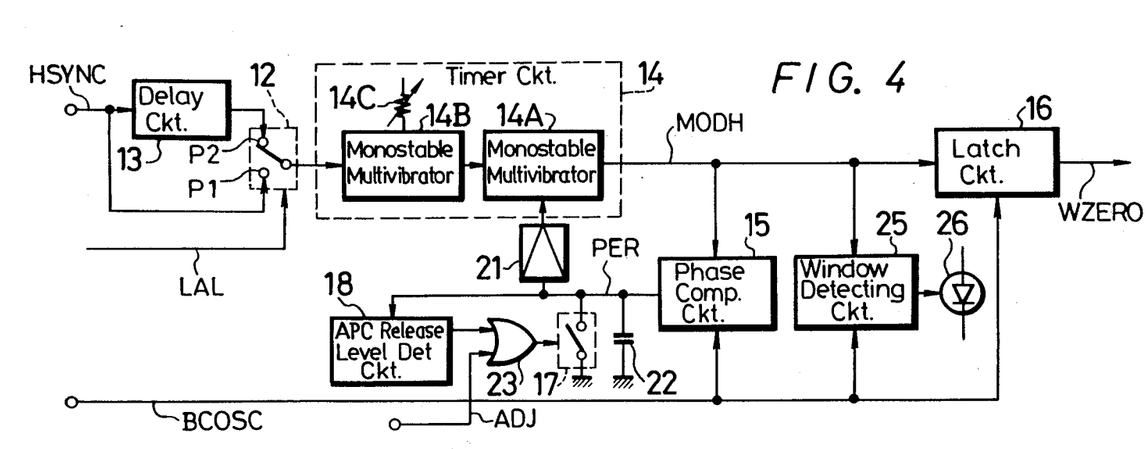
FIG. 4 is a block diagram showing a modified example of the prior art automatic phase control apparatus of FIG. 2.

To solve this problem, there is proposed a circuit as shown in FIG. 4. In FIG. 4, like parts corresponding to those of FIG. 2 are marked with the same references and will not be described in detail. As shown in FIG. 4, the timer circuit 14 is formed of a first monostable-multivibrator 14A which has a very large count time and a second monostable-multivibrator 14B which has a very small count time that is about one period of, for example, the burst signal. The phase error output PER from the phase comparing circuit 15 is supplied through the buffer circuit 21 to the first monostable-multivibrator 14A as a count time control signal thereof.

Further, the second monostable-multivibrator 14B is provided with a count time adjusting element 14C formed of, for example, a variable resistor, whereby the trailing edge of the timer output MODH can be adjusted delicately by adjusting the count time adjusting element 14C.

In this case, the output terminal of the phase comparing circuit 15 is connected with a phase error output holding capacitor 22 and an OR circuit 23 is connected between the APC releasing level detecting circuit 18 and the switching circuit 17, in which the switching circuit 17 is closed by an adjusting mode signal ADJ through this OR circuit 23.

The timer output MODH and the reference burst signal BCOSC are supplied to a window detecting circuit 25 which lights up a display element 26 when the phase difference therebetween reaches a predetermined window range. The window detecting circuit 25 detects when that the phase of the timer output MODH closely approaches the stable point (that is, any one of the zero cross points) of the reference burst signal BCOSC.

In the circuit arrangement of FIG. 4, before the APC operation is carried out by the phase comparing circuit 15 and the APC releasing level detecting circuit 18, the adjustment is performed such that the trailing phase of the timer output MODH approaches the stable point. More particularly, the adjusting mode signal ADJ is supplied through the OR circuit 23 to the switching circuit 17 to close the switching circuit 17, whereby the phase error output holding capacitor 22 of the phase comparing circuit 15 is discharged through the switching circuit 17 to ground potential so that the count time control signal of ground level is supplied to the first monostable-multivibrator 14A of the timer circuit 14. At that time, the first monostable-multivibrator 14A is controlled to the count time of the lock-in operation mode.

Under this state, the count time of the second monostable-multivibrator 14B is adjusted by adjusting the count time adjusting element 14C and the count time of the second monostable-multivibrator 14B is adjusted until the display element 26 lights up. As a result, if the display element 26 lights up, it can be presumed that the phase of the trailing edge of the timer output MODH produced in this adjusting operation approaches very closely the stable point to be locked in the stable points of the reference burst signal BCOSC.

If the display element 26 lights up, the adjusting mode signal ADJ is switched to the normal operation mode that is indicated by logic "0" and then the circuit is switched to the APC operation mode that is to be made by the phase comparing circuit 15 and the APC releasing level detecting circuit 18. At that time, it can be considered that according to this APC operation, since the timer output MODH is adjusted to lie substantially near the stable point of the reference burst signal BCOSC, the timer output MODH can easily be locked in the stable point.

However, the prior art circuit arrangement of FIG. 4 has the following problems.

When the switching circuit 17 is opened after the adjusting operation is carried out by the adjusting mode signal ADJ, the phase of the timer output MODH is locked in the stable point of the reference burst signal BCOSC by the APC operation, so that the display element 26 maintains its lit state. However, in practice, if under this state the phase of the reference burst signal BCOSC is displaced relative to the phase of the reproduced burst signal BURST (FIG. 1) by the temperature characteristic of each circuit and the like, since the timer output MODH serves to perform the APC operation, the display element 26 keeps lighting up and hence the phase displacement can not be detected. Accordingly, it is not possible to surely obtain the reproducibility of the phase by the circuit arrangement of FIG. 4. To remove this defect, a very complicated circuit arrangement; which can remove this defect, is required in addition to the APC loop.

Secondly, if the window of the window detecting circuit 25 is not made narrow the phase can not be adjusted accurately. However, if the window of the window detecting circuit 25 is made narrow as above, it becomes very difficult to carry out the adjusting operation by using the count time adjusting element 14C in practice.

Thirdly, since there is provided the window detecting circuit 25 as the phase comparing means in addition to the phase comparing circuit 15 forming the APC loop, if the displacement of temperature characteristic and secular variation occur in the comparing circuit 15 and the window detecting circuit 25, such displacement will lead to adjusting error directly.

OBJECTS AND SUMMARY OF THE INVENTION

Accordingly, it is an object of this invention to provide an automatic phase control apparatus of a simple circuit arrangement which can control the phase of a color subcarrier with reference to a horizontal synchronizing signal.

It is another object of this invention to provide an automatic phase control apparatus which is suitable for a time base corrector used in a video signal processing apparatus of a video tape recorder (VTR).

According to one aspect of the present invention, there is provided an automatic phase control apparatus for controlling a phase of a phase information pulse signal used for producing an initial address, the initial address being used for writing into or for reading out from a memory circuit of a time base corrector for reducing a time base error included in a reproduced video signal, including a phase shift circuit for shifting a phase of a horizontal synchronizing pulse, a phase comparator for comparing a phase between the phase-shifted horizontal synchronizing pulse and a constant wave signal being in phase with a chroma burst signal and a feedback circuit connected between the phase comparator and the phase shift circuit for applying a feedback signal in relation to an output signal of the phase comparator to the phase shift circuit so that the phase of the phase information pulse signal is synchronized with the constant wave signal, characterized by the feedback circuit comprising:

(a) a capacitor for holding an amplitude of the output signal of the phase comparator;

(b) a display circuit connected to the capacitor for indicating a value of the output signal of the phase comparator; and (c) a stabilizer circuit connected between the capacitor and a switch circuit for stabilizing the feedback signal so that a value of the feedback signal is substantially zero voltage when the switch circuit is operated.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 3A-1 to 3E-2 are respectively signal waveform diagrams showing signals at respective parts in the prior art automatic phase control apparatus shown in FIG. 2;

FIGS. 6A to 6C-3, FIGS. 7A to 7I and FIGS. 8A-1 to 8F-2 are respectively signal waveform diagrams at respective parts in the automatic phase control apparatus of the invention shown in FIG. 5.

DESCRIPTION OF THE PREFRRED EMBODIMENT

Figure 5:
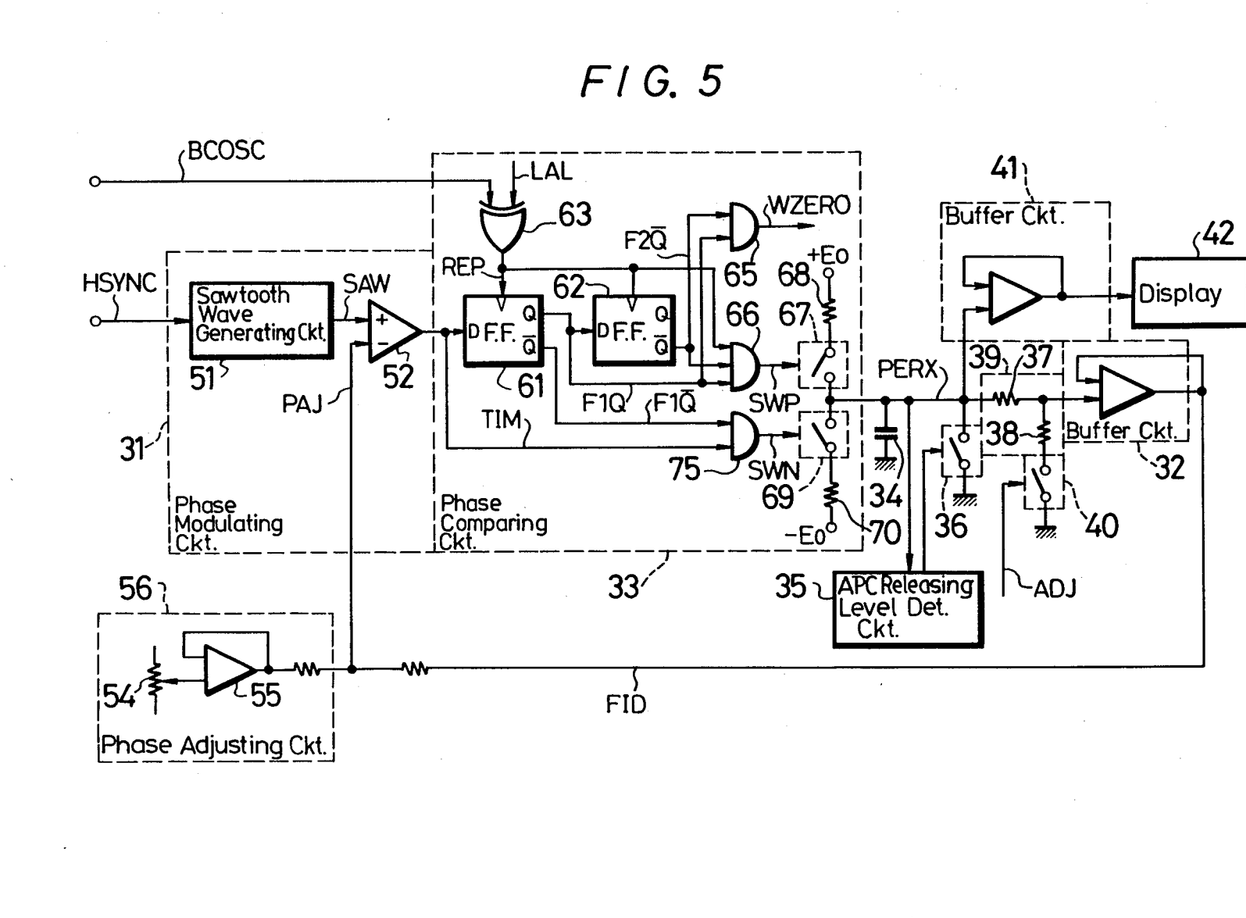
FIG. 5 is a block diagram showing an embodiment of an automatic phase control apparatus according to this invention.

Now, an embodiment of an automatic phase control apparatus according to this invention will hereinafter be described in detail with reference to the drawings. FIG. 5 is a circuit block diagram showing the embodiment of the automatic phase control apparatus according to this invention.

In FIG. 5, reference numeral 31 designates a phase modulating circuit which transmits to a phase comparing circuit 33 a modulated output TIM having the same period as that of the reproduced horizontal synchronizing signal HSYNC and which has a time duration corresponding to a feedback signal FID supplied through a buffer circuit 32 formed of an inverting amplifier circuit arrangement on the basis of a phase error output PERX. The phase comparing circuit 33 is supplied with the modulated output TIM and the reference burst signal BCOSC and then produces the write start pulse signal WZERO and the phase error output PERX corresponding to the phase difference between the modulated output TIM and the reference burst signal BCOSC.

A phase error holding capacitor 34 is connected to the output terminal of the phase comparing circuit 33 and the terminal voltage across the capacitor 34 is the phase error output PERX.

This phase error output PERX is supplied to an APC releasing level detecting circuit 35 in the same way as mentioned in FIG. 2. Hence, the phase error output PERX can be returned to ground potential by closing a switching circuit 36 by the detected output therefrom.

The phase error output PERX is grounded through a stabilizer circuit 39 formed of a series circuit consisting of a resistor 37 (the resistance value thereof is R2) and a resistor 38 (the resistance value thereof is R1) and a switching circuit 40. When the switching circuit 40 is closed by the mode adjusting signal ADJ, the phase error output PERX is divided by the resistors 37 and 38 and then fed to the buffer circuit 32 which produces a feedback signal FID.

The phase error output PERX is further supplied through a buffer circuit 41 to a display 42 which displays the phase error output PERX in the form of, for example, a scale.

The phase modulating circuit 31 includes a sawtooth waveform generating circuit 51 which receives the reproduced horizontal synchronizing signal HSYNC (FIG. 6A) and produces at its output terminal a sawtooth waveform output SAW which is triggered at the trailing edge of the reproduced horizontal synchronizing signal HSYNC and which is rectilinearly increased during a predetermined interval T1. This sawtooth waveform output SAW is supplied to a non-inverting input terminal of a level comparing circuit 52.

To the inverting input terminal of the level comparing circuit 52, there is supplied a phase adjusting output PAJ which results from adjusting the signal level of the feedback signal FID by a phase adjusting circuit 56 formed of a zero level setting variable resistor 54 and an inverting amplifier 55. The phase adjusting circuit 56 can set or change the signal level of the phase adjusting output PAJ in a range from an upper limit L2 to a lower limit L3 with a signal level shown by reference numeral L1 as the reference in FIG. 6B by adjusting the zero level setting variable resistor 54.

Figures 6A, 6B, 6C:
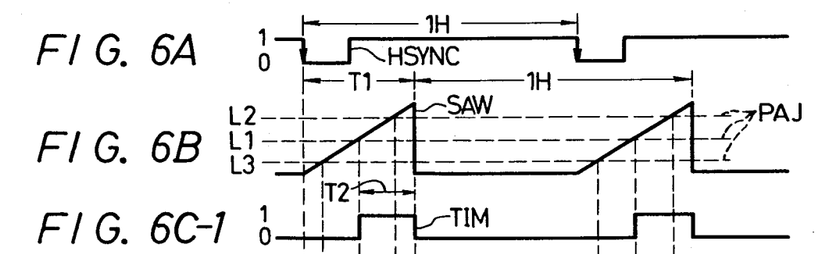
Figure 6C:
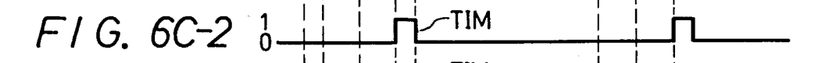
Figure 6C:
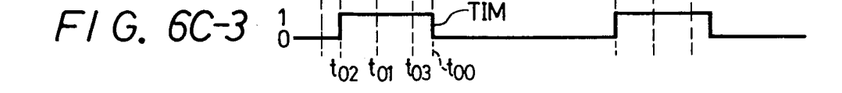

Accordingly, the comparing circuit 52 produces at its output terminal, when the signal level of the phase adjusting output PAJ is adjusted to the signal level L1 (this is called a zero point adjustment), a modulated output TIM which rises up from its logic level "0" to "1" at a time point $t_{01}$ which is advanced by an interval T2 with reference to a time point $t_{00}$ of the trailing edge of the sawtooth waveform output SAW as shown in FIG. 6C-1 and this modulated output TIM is delivered from the phase modulating circuit 31. If the signal level of the phase modulated output PAJ is fluctuated from this state in a range from the upper limit L2 to the lower limit L3 in response to the change of the feedback signal FID, the leading edge of the modulated output TIM is changed from the time point $t_{01}$ corresponding to the zero point to a time point $t_{03}$, which is delayed at maximum or a time point $t_{02}$, which is advanced at maximum, as shown in FIGS. 6C-2 or 6C-3. In the case of this embodiment, since the values of the maximum phase delayed times $t_{01}$ to $t_{03}$ and the maximum phase advanced times from $t_{01}$ to $t_{02}$ are respectively selected to be the values corresponding to substantially one period (280 ns) of the color subcarrier, the phase locking-in operation can be carried out in a range of ± one period of the color subcarrier from the position of the reference phase.

Figure 7A:
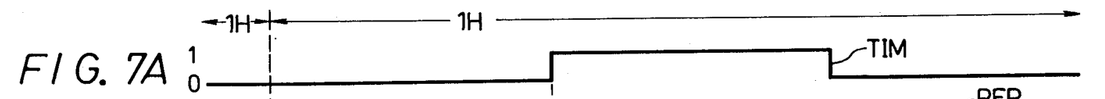
Figure 7B:
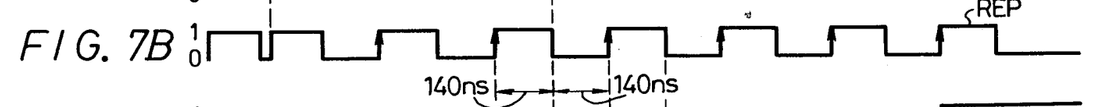

The phase comparing circuit 33 includes flip-flop circuits 61 and 62 in two stages, in which the preceding flip-flop circuit 61 receives at its D input terminal the modulated output TIM of the phase modulating circuit 31, and at its clock input terminal a reference time signal REP which is produced at the output terminal of an exclusive-OR circuit 63 which receives a line sequential signal LAL changing its logic level at a period of ½H and the reference burst signal BCOSC. The reference time signal REP is a pulse signal which, as shown in FIG. 7B, has the same as that of the subcarrier and a duty ratio of ½ in which the phase is displaced by ½ period (140 ns) between the adjacent 1H intervals.

Figure 7C:
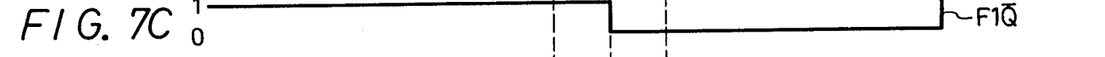
Figure 7D:
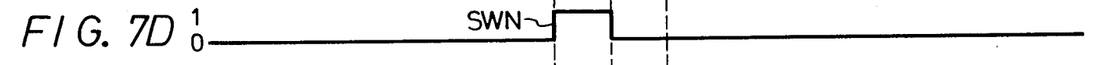
Figure 7E:
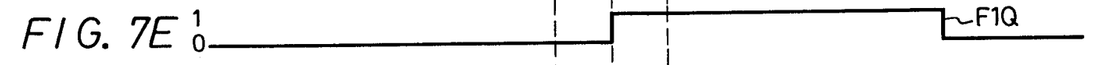

Accordingly, the flip-flop circuit 61 is set at the first leading edge of the reference time signal REP after the modulated output TIM (FIG. 7A) changes its logic level from logic "0" to logic "1" so that it produces at its $\overline{Q}$ output terminal an output $\overline{FIQ}$ (FIG. 7C) which falls down to logic "0" and at its Q output terminal a Q output FIQ (FIG. 7E) which rises up to logic "1".

Figure 7F:
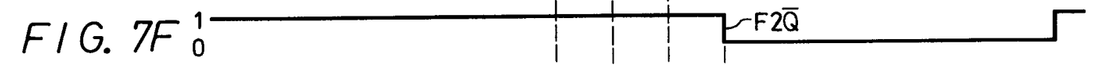

The Q output FIQ of the preceding flip-flop circuit 61 is supplied to the D input terminal of the succeeding flip-flop circuit 62 and the flip-flop circuit 62 is supplied at its clock input terminal with the reference time signal REP, whereby after the preceding flip-flop circuit 61 is set, the succeeding flip-flop circuit 62 is set at the first leading edge of the reference time signal REP and delivers a $\overline{Q}$ output $\overline{F2Q}$ which falls down to logic "0" at that time point as shown in FIG. 7F.

Figure 7G:
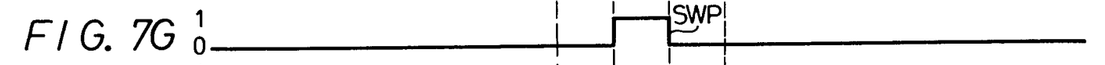
Figure 7H:
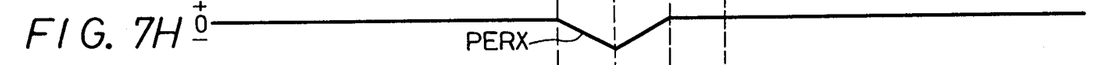
Figure 7I:
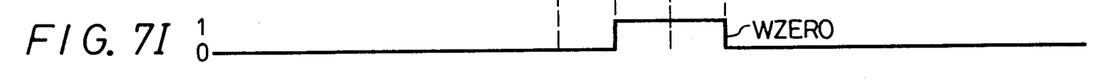

The Q output FIQ of the flip-flop circuit 61 and the $\overline{Q}$ output $\overline{F2Q}$ of the flip-flop circuit 62 are supplied to a two-input AND circuit 65 which then delivers its AND output as the write start pulse signal WZERO (FIG. 7I).

Further, the Q output F1Q of the flip-flop circuit 61, the $\overline{Q}$ output F2$\overline{Q}$ of the flip-flop circuit 62 and the reference time signal REP are respectively supplied to a three-input AND circuit 66 whose AND output SWP (FIG. 7G) is supplied to a switching circuit 67 as its close control signal. This switching circuit 67 receives a positive voltage $+E_0$ through a resistor 68 and supplies it to the phase error holding capacitor 34 so that the phase error holding capacitor 34 is charged by the positive voltage.

Further, the $\overline{Q}$ output F1$\overline{Q}$ of the flip-flop circuit 61 and the modulated output TIM are respectively supplied to a two-input AND circuit 75 whose AND output SWN (FIG. 7D) controls a switching circuit 69 to be closed. This switching circuit 69 receives a negative voltage $-E_0$ through a resistor 70 and supplies it to the phase error holding capacitor 34, whereby the voltage held in the phase error holding capacitor 34 is discharged to the negative voltage source $-E_0$.

In the circuit arrangement of FIG. 5, when the zero point of the automatic phase control circuit is adjusted, the switching circuit 40 is turned on by the adjusting mode signal ADJ and the voltage held in the phase error holding capacitor 34 is discharged through the resistors 37, 38 and the switching circuit 40 to thereby make the voltage level of the phase error output PERX equal to ground potential. If under this state the signal level of the phase adjusting output PAJ is adjusted to the level L1 of FIG. 6B by operating the zero level setting variable resistor 54 of the phase adjusting circuit 56, this signal level is compared with the sawtooth waveform output SAW of the sawtooth waveform generating circuit 51 by the level comparing circuit 52, whereby the leading edge of the modulated output TIM becomes equal to the reference point $t_{01}$ (FIG. 6C-1) and then the modulated output TIM becomes substantially equal to or becomes very close to the phase of the trailing edge of the reference time signal REP (FIG. 7B) as shown in FIG. 7A.

Since the negative side switching signal SWN (FIG. 7D) rises up at the leading edge of this modulated output TIM and falls down at the timing of the leading edge of the reference time signal REP which appears first thereafter, a duration of time in which the switching circuit 69 is being turned on becomes $\frac{1}{2}$ period (140 ns) of the reference time signal REP.

Whereas, the positive side switching signal SWP (FIG. 7G) always rises up during the $\frac{1}{2}$ period (140 ns) of the reference time signal REP. Accordingly, the positive voltage charged in the capacitor 34 through the switching circuit 67 and the negative voltage discharged through the switching circuit 69 become equal with each other so that the adjustment of the zero point of the automatic phase control apparatus is ended.

If under this state the switching circuit 40 is opened by changing the logic level of the adjusting mode signal ADJ to the logic level "0", the phase error output PERX held in the capacitor 34 becomes such a state to response to the change of the operation time of the switching circuit 69, i.e., the change of the leading edge phase of the modulated output TIM. However, in this case, the zero point is already adjusted so that the APC loop is taken into the phase lock mode immediately.

Figure 8A:
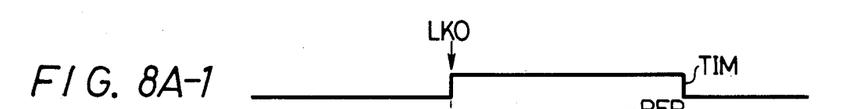
Figures 8A, 8B:
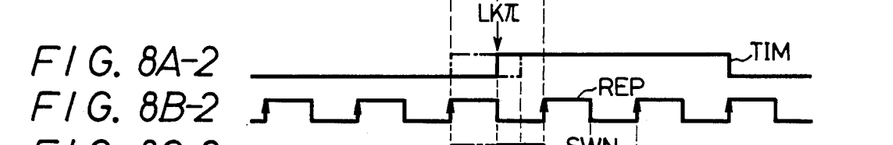
Figures 8B, 8C, 8D:
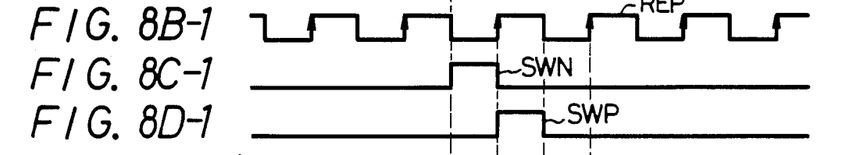

In a mode (this mode is called a zero-phase mode) in which the phase is locked to the phase of the color subcarrier of the N-th scanning line described in connection with, for example, FIGS. 3A-2 to 3E-2, let it be assumed that the write start pulse signal WZERO (FIG. 8F-1) is produced at a time point delayed by the $\frac{1}{2}$ period of the color subcarrier from a lock point LK0 by locking the loop to the lock point LK0 as shown in FIGS. 8A-1 to 8F-1.

In a mode (this is called a $\pi$ phase mode) in which the write start pulse signal WZERO (FIG. 8F-2) is produced at a phase delayed by $\frac{1}{2}$ period from this lock point by displacing this lock point to a phase LK$\pi$ that is delayed by $\frac{1}{2}$ period from the color subcarrier as shown in FIGS. 8A-2 to 8F-2, the phase of the reference time signal REP is displaced from the state shown in FIG. 8B-1 to the state of FIG. 8B-2 by $\frac{1}{2}$ period so that the first leading edge following the leading edge (shown by a broken line in FIG. 8A-2) of the modulated signal TIM is delayed by this amount so that the negative side switching signal SWN becomes wide transiently in pulse width by the amount of the shifted phase as shown by a broken line in FIG. 8C-2.

At that time, the phase error holding capacitor 34 is greatly discharged by the negative voltage $-E_0$ transiently through the switching circuit 69 so that the level of the phase error output PERX is lowered considerably as shown by a broken line in FIG. 8E-2. This large lowering of the phase error output PERX increases the signal level of the phase adjusting output PAJ (FIG. 6B) to the phase comparing circuit 52 so that the phase of the leading edge of the modulated output TIM is considerably delayed (in the direction approaching the limit shown in FIG. 6C-2). As a result, as shown by a one-dot chain line in FIG. 8A-2, the rising phase of the modulated output TIM is temporarily delayed from the locking point LK$\pi$ and in response thereto, the rising phase of the negative side switching signal SWN (FIG. 8C-2) is delayed considerably.

Figures 8C, 8D:
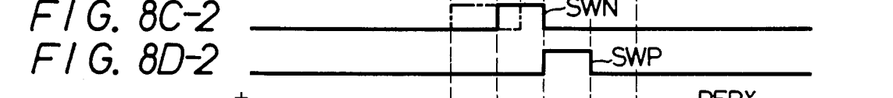
Figure 8E:
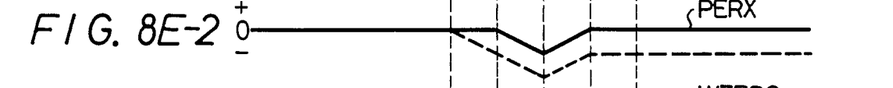

Under this state, the discharging amount of the voltage discharged from the capacitor 34 through the switching circuit 69 is limited considerably so that the level of the phase error output PERX is increased by that amount. As a result, since the signal level of the phase adjusting output PAJ is lowered, the rising phase of the modulated output TIM approaches the lock point LK$\pi$ so that in accordance therewith, the pulse width of the negative side switching signal SWN is returned to the rising width substantially same as that of the positive side switching signal SWP (FIG. 8D-2). Hence, the signal level of the phase error output PERX is returned to zero.

Figures 8E, 8F:
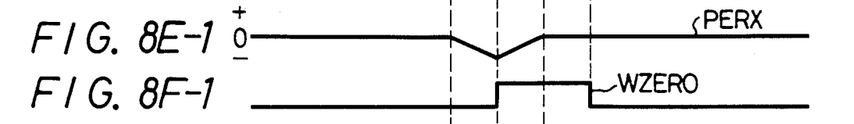
Figure 8F:
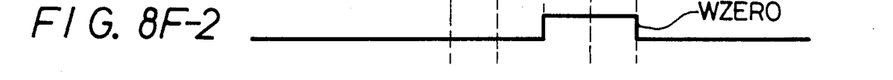

Accordingly, in the $\pi$ phase mode, except for fact that the phase lock point is delayed by $\frac{1}{2}$ period as compared with a case in which the phase lock point is the zero phase mode, the phase locked state is established similarly to the case of the zero phase mode. Therefore, the write start pulse signal WZERO (FIG. 8F-2) whose phase is delayed by $\frac{1}{2}$ period can be produced from the AND circuit 65.

When the mode is changed from the $\pi$ phase mode to the zero phase mode, the phase locked states as shown in FIGS. 8A-1 and 8F-1 can be established once again as before.

Figure 9:
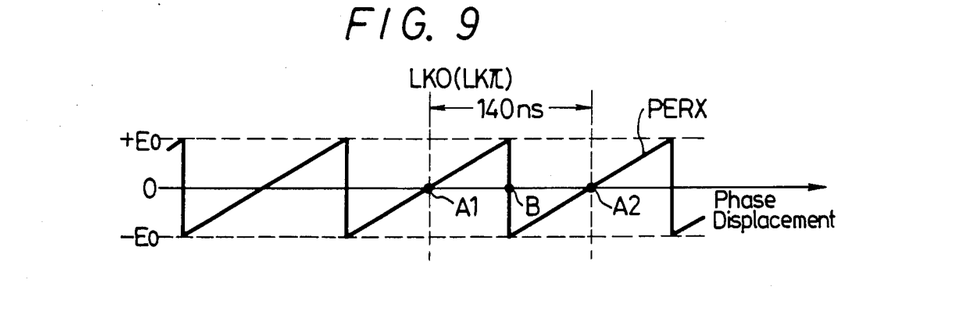
FIG. 9 is a characteristic graph showing a phase characteristic of the circuit shown in FIG. 5.

The phase characteristic of the automatic phase control circuit shown in FIG. 5 becomes as shown in FIG. 9, in which as the phase error output PERX changes when the reference time signal REP, i.e., the phase of the color subcarrier, is gradually displaced, there are sequentially produced locking points A1 and A2 at which the APC loop is stabilized each time that the phase of the color subcarrier is displaced by every period, while between the phase locking points A1 and A2, there exists a non-stable point B at which the phase error output PERX becomes zero but at which the APC loop can not stabilized. Therefore, if the zero point can be adjusted to the stable point A1 or a nearby point when the switching circuit 40 is closed by the adjusting mode signal ADJ, the automatic phase control apparatus carries out the APC operation so that the phase can be positively phase-locked to this stable point A1. Thus, the write start pulse signal WZERO can be produced with stable phase.

When such zero point adjustment is performed, since the switching circuit 40 responsive to the adjusting mode signal ADJ is provided with the stabilizer circuit 39 that is formed by a series circuit of the resistors 37 and 38, there is no fear that upon adjusting the zero point, the zero point will be adjusted to the non-stable point B (FIG. 9).

In this connection, if the resistor 38 is not connected in series to the switching circuit 40, when the signal level of the feedback signal FID is set at a zero level by way of the switching circuit 40, there is then a fear that the zero point adjustment will be carried out under the condition that the phase error output PERX produced in the phase error holding capacitor 34 is superimposed upon the positive voltage $+E_0$ or the negative voltage $-E_0$. However, in the embodiment of this invention, since the resistor 38 is connected in series to the switching circuit 40, as the feedback signal FID there can be fed back to the phase modulating circuit 31 the voltage divided by the resistors 37 and 38 and which is expressed by the following equation (1)

$$FID = \frac{R1}{R1 + R2} \cdot PERX \qquad (1)$$

Upon zero point adjusting, even if the undesired voltage occurs in the capacitor 34, this undesired voltage can be returned to the zero level by using the APC loop. Accordingly, it is possible to remove a fear that the zero point will be adjusted to the wrong point inadvertently.

According to the circuit arrangement shown in FIG. 5, since the phase error output PERX is displayed by the display 42, it is possible to easily confirm whether upon adjusting the zero point, the adjustment is carried out accurately or not.

In addition, while the APC operation is being carried out after the zero point is once adjusted, the phase error output PERX can be memory-displayed on the display 42. Accordingly, if changes due to the temperature characteristic and secular variation occur in each circuit after the zero point adjustment is carried out, they appear in the phase error output PERX as phase error which can be easily confirmed by the display 42.

While in the above-described embodiment the write start pulse signal WZERO for the time base correcting apparatus is obtained by establishing the phase relation of the color burst signal based on the horizontal synchronizing signal of the composite video signal, the present invention is not limited to the above embodiment but can be widely applied to such cases as when the read start pulse signal RZERO is obtained, to other apparatus such as a color framing apparatus and to such a case when the horizontal synchronizing signal is related to the phase of the color subcarrier, etc.

While in the above-described embodiment the buffer circuit 41 and the display 42 are provided for enabling the user to see the phase error output PERX, instead of or together therewith the phase error output PERX can be supplied to a similar circuit arrangement formed of the window detecting circuit 25 and the light emitting element 26 as mentioned in connection with FIG. 4, whereby the phase error output PERX can be displayed by lighting up the light emitting element 26.

As set forth above, according to the present invention, it is possible to easily realize the automatic phase control apparatus with a simple circuit arrangement which can positively establish the phase relation of the color subcarrier based on the horizontal synchronizing signal.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

I claim as my invention:

1. A phase control apparatus for controlling a phase of a phase information pulse signal used for producing an initial address, said initial address being used for writing into or for reading out from a memory circuit of a time base corrector for reducing a time base error included in a reproduced video signal, said phase control apparatus including a phase shift circuit for shifting a phase of a horizontal synchronizing pulse, a phase comparator for comparing a phase between the phase shifted horizontal synchronizing pulse and a constant wave signal in phase with a chroma burst signal, and a feedback circuit connected between said phase comparator and said phase shift circuit for applying a feedback signal, generated in accordance with an output signal of said phase comparator, to said phase shift circuit so that the phase of said phase information pulse signal is synchronized with said constant wave signal, characterized by said feedback circuit comprising:
   capacitor means for holding an amplitude of said output signal of said phase comparator;
   display circuit means connected to said capacitor means for indicating a value of said output signal of said phase comparator;
   switch circuit means; and
   stabilizer circuit means connected between said capacitor means and said switch circuit means for stabilizing said feedback signal so that a value of said feedback signal is approximately zero voltage when said switch circuit means is operated.

2. The apparatus according to claim 1, in which said stabilizer circuit means includes a plurality of serially-connected resistors, a first of said resistors being connected to said capacitor means and a second of said resistors being connected to said switch circuit means, wherein a resistance value of said first resistor is larger than that of said second resistor.

* * * * *